M. R. COLBY & E. W. TAYLOR.
MEANS FOR HOISTING AND CONVEYING LUMBER PACKAGES.
APPLICATION FILED JULY 31, 1914.
1,152,879.
Patented Sept. 7, 1915.
2 SHEETS—SHEET 2.
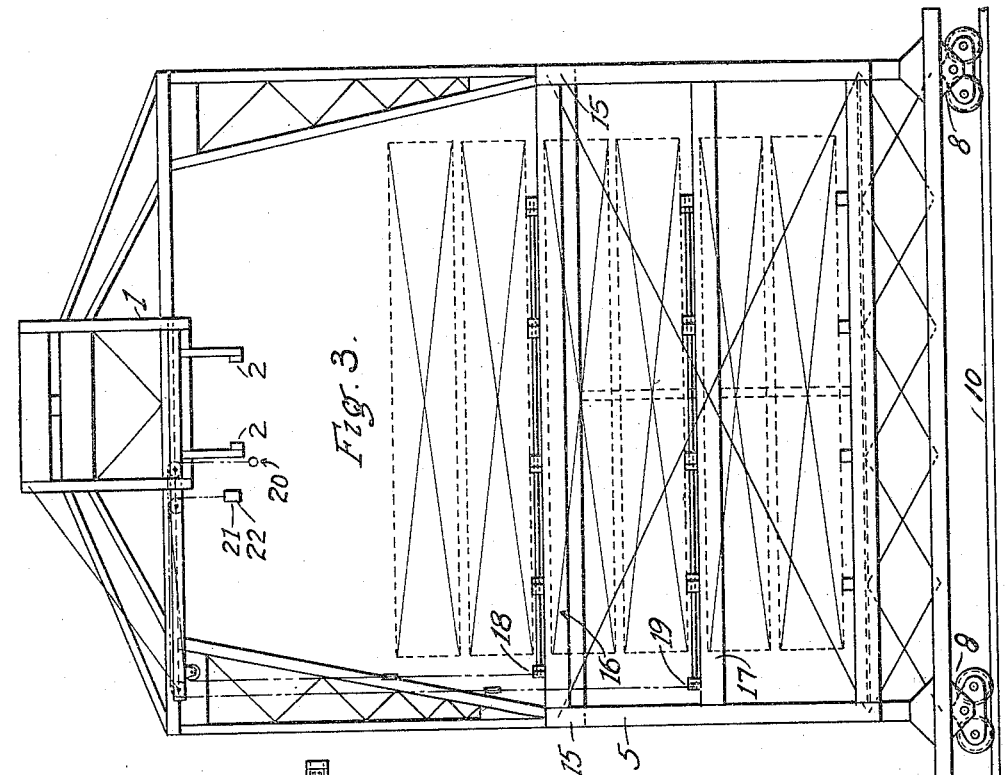
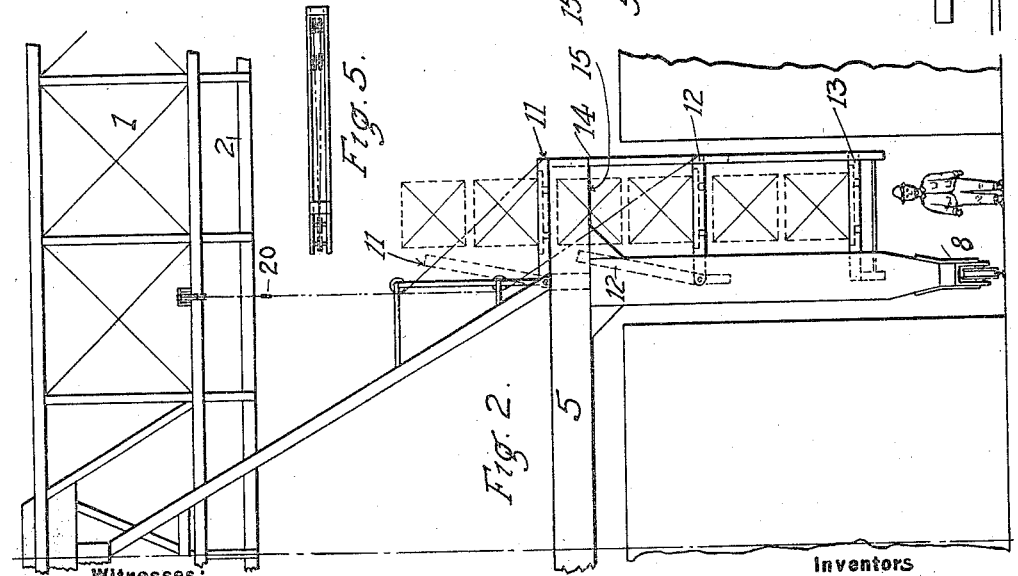
Inventors
Mark R. Colby
Ernest W. Taylor.
By George C. Wing
Attorney

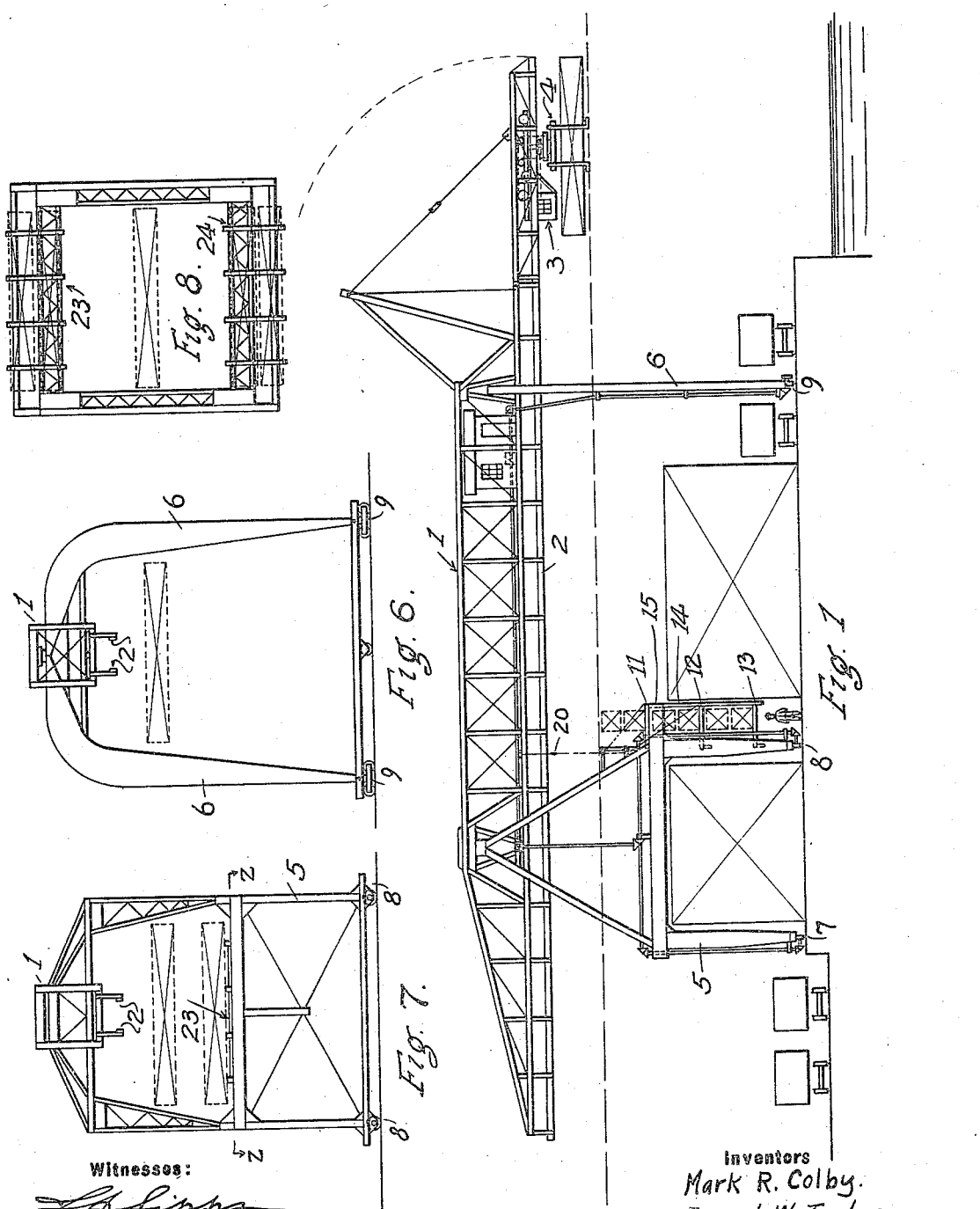

UNITED STATES PATENT OFFICE.

MARK R. COLBY, OF PORTLAND, OREGON, AND ERNEST W. TAYLOR, OF CLEVELAND, OHIO, ASSIGNORS TO THE BROWN HOISTING MACHINERY COMPANY, OF CLEVELAND, OHIO, A CORPORATION.

MEANS FOR HOISTING AND CONVEYING LUMBER-PACKAGES.

1,152,879.  Specification of Letters Patent. Patented Sept. 7, 1915.

Application filed July 31, 1914. Serial No. 854,378.

*To all whom it may concern:*

Be it known that we, MARK R. COLBY and ERNEST W. TAYLOR, citizens of the United States, residing, respectively, at the city of Portland, in the county of Multnomah and State of Oregon, and the city of Cleveland, in the county of Cuyahoga and State of Ohio, have invented a new and useful Improvement in Means for Hoisting and Conveying Lumber-Packages, of which the following is a full, clear, and exact description, reference being had therein to the drawings that accompany and form a part of the specification, wherein similar parts are designated by the same numerals in each instance.

The object of the invention under consideration is to increase the efficiency and operative value of hoisting and conveying machines when employed, usually on dock property and in storage yards, to move definite and compact packages of lumber and other material or articles, from one point, as the holds of vessels, or other bodies of railroad cars, to another point, as to other vessels or cars, or to particular piles or portions of the storage grounds within the operative range of the machine itself. The type of the machine generally used for this purpose and to which our improvement is directed, is essentially characterized by an overhead bridge-tramway for the travel of a trolley thereon, hoisting and lowering mechanism and tackle connected with the trolley, and a bridge-supporting element, movably mounted on rails that lead between terminals at which load-units are to be taken on or delivered, and through any storage space for such loads that intervenes. The supporting-element above alluded to, in this class of machine, has heretofore consisted of either a single hollow columnar framework structure with a so-called balanced cantaliver bridge supported thereby, or, of two supporting elements, one of which, known as a shear-leg, or A-frame, being located at the front or water end of the bridge, and the other, known as the pier, at or near the inner or land end of said bridge.

The shear-leg, as is well understood, is a simple triangular frame-work structure, mounted on a single rail, and without any considerable area or breadth dimension at its base. The pier-support, however, is a double-track structure in every instance, being a four-post square-base, portal framework, which converges at the top in most cases, toward the supported bridge, the latter following, in its elevated place, the median line of the support through its top. These piers are hollow in their vertical direction with a diameter or section throughout the interior corresponding with the wheel-base, and, of course, having a free space or passageway through their upper portion or superstructure, for the trolley and its depending load. In handling lumber-packages by said form of machine, as when unloading a vessel of a cargo of this description and distributing the loads throughout the storage yard, it is necessary, unless certain ancillary and costly mechanism is installed, in order to convey the cargo to the several piling points throughout the yard, that the whole ponderous machine and plant, be traversed along its rails to said points each and every time a package is hoisted from the vessel and also while the package is swinging from the trolley.

There is no provision in the design of the hoisting and conveying machine itself for either accumulating the loads it is to finally convey to the several distributing or piling places in the yard, relieving the trolley of the load-units during the conveying process, or, indeed, for conveying more than a single lumber-package, at one trip of the machine to the piling places. It is to meet these deficiencies in said present appliances and provide for the same in a simple and inexpensive manner, that the ideas herein explained and illustrated, have been conceived and worked out in practical forms.

Figure 1 is a side elevation of a hoisting and conveying machine containing one form of our said improvement. Fig. 2 is a side view of a portion of such a machine, with dotted lines indicating load-units in place thereon. Fig. 3 is an end view of a pier provided with the improvement feature disclosed in the previous figures. Fig. 4 is a plan view of the platform part entering into the feature previously disclosed. Fig. 5 indicates, in plan, the form of sheave support that may be included in the mechanism employed for operating said special improvement. Fig. 6 is a front view of a shear-leg having the necessary clearance to meet the conditions of said improvements. Fig. 7 is an end view of the pier structure of a hoisting and conveying machine, as adapted to another form of our improvement, and, Fig. 8 is a plan view, on the lines z z, of Fig. 7.

In the drawings (Fig. 1) 1 is a truss-bridge of the usual type to contain the tramway of an overhead hoisting and conveying machine. Said tramway is indicated by 2, 2, the trolley by 3, and its lumber-grapple by 4. The proper and customary mechanism for hoisting or lowering the grapple to or from the trolley, and for traversing the trolley along its trackway are assumed to be a part of the machine. The bridge-supporting elements, in this case, consist of a portal pier 5, near the inner or land end of the bridge, and the shear-legs 6, 6, at the outer or water end of the same. The two legs 6, 6, which are the essential members of the shear-support, do not approach each other toward their upper ends on acute angles to the base-member, as in the ordinary A-bent formation, but are approximately at right angles to said base and vertical in their directions until above the tramway proper when their upper ends are abruptly turned inwardly toward each other to their respective connection points at the sides of the bridge. In this manner ample clearance is provided for the passage between said legs of the trolley and lumber package when the latter is cross-wise of the track and trolley. In like manner, the corner-posts of the pier are similarly vertically related to its base-frame, extend to the same upward point, and are spaced, one from the other, in the direction cross-wise of the tramway by intervals that are wider than the length of the package that is to be carried by the trolley between the same. Said supporting elements are carried on wheels or trucks indicated by 7, 8 and 9, which are themselves mounted on tracks, shown at 10, that extend throughout the general storage area, and, by this means, enable the machine to convey the loads it has hoisted at one point along the tracks, to another point along the same to which it is desired to transfer such loads.

In the arrangement shown in Figs. 1 to 6 or to which such figures relate, a series of rectangular platforms or shelf-like projections, 11, 12 and 13, are arranged horizontally, one above the other, across the sides of the portal pier transversely of the bridge. This arrangement, in the apparatus of said figures, is operatively effected by hinging said load-unit platforms, except the lowermost platform, 13, in the series, along their inner sides, to the portal pier, and, in order to support the same, and any loads thereon, when said platforms have been rotated around their hinges to a horizontal position, a hollow rectangular framework structure 14, is securely suspended, in front of and inclosing said series, from the parallel portal-girders 15, 15, that overhang said pier, at about midway of the same. Across the front portion of this frame-work 14, within the radial limits of rotation of the platforms 11 and 12, and at the proper heights to be severally encountered by said platforms when they are revolved about their hinges to their horizontal positions, is a corresponding series of supporting cross-struts 16 and 17. Suitable means of separately retracting the platforms 11 and 12 from a horizontal position when resting on their respective cross-struts, to an upright position behind the face of the pier, should be supplied. Such a means is indicated in the drawings, by the sheave and rope systems which extend, respectively, between the lever-arms 18 and 19, on the platforms 11 and 12, and a point 20 on the bridge within operative reach of the trolley-man. By pulling in the ropes of these systems in succession, at said point, the lever-arms 18 and 19 may be sequentially actuated, and their platforms correspondingly rotated around their hinges to permit the lowering, in due order, of load-units to and upon other platform-members below. To facilitate the operation of said system, counterweights 21 and 22 are shown as connected to the sheave ropes, in the direction of their pulls.

As will be obvious, the lower platform-projection, 13, need not be hinged, and it is not so shown, but it is supposed to be permanently fixed in its horizontal position.

The secondary form of the improvement, illustrated in Figs. 7 and 8, consists in omitting from and in connection with a widened portal pier of the kind above described, the hinged platform or platforms explained, but, retaining the fixed horizontal platform corresponding with 13, for the purpose of securing and carrying load-units thereon during the conveying movements or travels of the machine through the storage yard space. Instead, however, of locating this fixed platform or shelf near the lower part of the transverse sides or ends of said portal-pier, as in Figs. 1 and 2, it can be more advantageously placed, under the circumstances, higher up on said pier, immediately beneath the clearance line of the travel of the loads, as shown at 23 and 24 in Figs. 7 and 8. Said platforms may, of course, be located on either or both of the ends or faces of the pier, and each may be given suitable dimensions to accommodate one or more load-units, all as may be determined in each case.

The advantages of the foregoing described additions to hoisting and conveying machines, in the connections referred to, will be apparent. The initial cost of the machine will be but slightly increased, since said additions call for only a minimum of additional material and mechanism. Nevertheless, the gain in the conveying efficiency of the machine will thereby be important, and fully equal to any other expedient now used to that end. In addition, this gain in efficiency will be accomplished at a comparatively ignorable operative cost inasmuch as the improvements designed involve but few or no mechanical features and consequently no additional operators in the connection or special cost for maintenance, renewals or repairs.

It is not intended by the foregoing specific description to limit the scope of the invention to the concrete apparatus and application of the same herein shown and described. Said improvement may, of course, be realized in a variety of forms. The provision for temporarily accumulating load-units upon the supporting-elements, for instance, may be brought about by utilizing either one or both of such elements when there are more than one in a given machine, or one or both ends of such piers or supports. So, too, any other manner of arranging for the retraction or collapse of the shelf-projections than by hinging the same will be equally within said invention.

Having thus described said invention what we claim and wish to protect by Letters Patent, is as follows:

1. As a means for hoisting and conveying lumber and similar load-units, the combination, with a portable bridge-tramway hoisting and conveying machine, of a supporting element for the same provided with a load-accumulating platform, transversely and below the level of the travel of said trolley and load, the members of which series above the lowermost being hinged to said element, together with suitable mechanism for severally retracting said members around their said hinged connection, substantially as shown and described.

2. As a means for hoisting and conveying lumber and similar load-units, the combination, with a portable bridge-tramway, of a trolley movable on the tracks of the same, hoisting mechanism connected with said trolley, a supporting pier having an open space in its upper portion of suitable dimensions to permit the passage therethrough of the trolley and load when traversed along the tramway with the load suspended from and crosswise of the trolley, and a series of shelf-like projections on the pier, in vertical alinement with each other, beneath and transversely arranged with respect to the range of travel of said trolley and load, the members of said series above the lowest being retractable from their projected relation to the pier, substantially as shown and described.

MARK R. COLBY.
ERNEST WILLIAM TAYLOR.

Witnesses as to said Colby:
GEORGE P. STANLEY,
J. M. ROBISON.

Witnesses as to said Taylor:
ALEXANDER C. BROWN,
CARROLL W. BROWN.

Copies of this patent may be obtained for five cents each, by addressing the "Commissioner of Patents, Washington, D. C."